(12) United States Patent
Chiu (10) Patent No.: US 9,829,928 B2
(45) Date of Patent: Nov. 28, 2017

(54) KEYBOARD MODULE AND ELECTRONIC DEVICE

(71) Applicant: ASUSTeK COMPUTER INC., Taipei (TW)

(72) Inventor: Chien-Hsing Chiu, Taipei (TW)

(73) Assignee: Asustek Computer Inc., Taipei (TW)

( * ) Notice: Subject to any disclaimer, the term of this patent is extended or adjusted under 35 U.S.C. 154(b) by 0 days.

(21) Appl. No.: 15/174,258

(22) Filed: Jun. 6, 2016

(65) Prior Publication Data

US 2016/0363962 A1    Dec. 15, 2016

Related U.S. Application Data

(60) Provisional application No. 62/175,689, filed on Jun. 15, 2015.

(30) Foreign Application Priority Data

May 4, 2016  (CN) .......................... 2016 1 0288456

(51) Int. Cl.
G06F 1/16 (2006.01)
H01H 13/86 (2006.01)
G06F 3/02 (2006.01)

(52) U.S. Cl.
CPC .......... *G06F 1/1669* (2013.01); *G06F 1/1666* (2013.01); *H01H 13/86* (2013.01); *G06F 1/1624* (2013.01); *G06F 3/0221* (2013.01); *H01H 2223/052* (2013.01); *H01H 2231/042* (2013.01)

(58) Field of Classification Search
CPC .... G06F 1/1666; G06F 3/0221; G06F 1/1624; G06F 1/1669; H01H 2223/052; H01H 13/86

USPC ......................................... 361/679.13, 679.17
See application file for complete search history.

(56) References Cited

U.S. PATENT DOCUMENTS

| | | | | |
|---|---|---|---|---|
| 5,635,928 A | * | 6/1997 | Takagi .................. | G06F 1/1616 341/22 |
| 2014/0168875 A1 | * | 6/2014 | Nakamura ............ | G06F 1/1666 361/679.09 |
| 2014/0183019 A1 | * | 7/2014 | Misawa ................ | G06F 1/1616 200/5 A |
| 2014/0355188 A1 | | 12/2014 | Liu | |

FOREIGN PATENT DOCUMENTS

| | | |
|---|---|---|
| CN | 204067138 | 12/2014 |
| TW | M498956 | 4/2015 |

\* cited by examiner

*Primary Examiner* — James Wu
(74) *Attorney, Agent, or Firm* — Muncy, Geissler, Olds & Lowe, P.C.

(57) ABSTRACT

A keyboard module pivotally connected to an electronic device is provided. The keyboard module comprises a bottom plate, a plurality of keys, a keyboard frame and a hinge structure. The plurality of keys are disposed on the bottom plate. The key includes a keycap and a support member for connecting the keycap to the bottom plate. The keyboard frame includes a plurality of openings to expose the keycaps. The hinge structure pivotally connects a display module of the electronic device with the keyboard frame or the bottom plate. When the display module rotates to drive the keyboard frame (or the bottom plate), the keycap moves relative to the keyboard frame (or the bottom plate). An electronic device including the keyboard module is also provided.

3 Claims, 8 Drawing Sheets

KEYBOARD MODULE AND ELECTRONIC DEVICE

CROSS-REFERENCE TO RELATED APPLICATION

This application claims the priority benefit of U.S. provisional application Ser. No. 62/175,689, filed on Jun. 15, 2015, and China application serial No. 201610288456.1, filed on May 4, 2016. The entirety of the above-mentioned patent applications are hereby incorporated by references herein and made a part of specification.

BACKGROUND OF THE INVENTION

Field of the Invention

The invention relates to an electronic device and, more specifically, to a keyboard module and an electronic device.

Description of the Related Art

Consumer electronic devices, such as Ultrabooks, or bluetooth keyboards adapted for tablet computers, are developed to be light and thin. However, keys of a thin-type keyboard have disadvantages such as hard pressing and weak feedback feelings.

BRIEF SUMMARY OF THE INVENTION

According to a first aspect, a keyboard module pivotally connected to an electronic device is provided. The keyboard module comprises a bottom plate, a plurality of keys, a keyboard frame and a hinge structure. The keys are disposed on the bottom plate. The key includes a keycap and a support member for connecting the keycap to the bottom plate. The keyboard frame includes a plurality of openings to expose the keycaps. The hinge structure pivotally connects a display module of the electronic device with the keyboard frame or the bottom plate. When the display module rotates to drive the keyboard frame or the bottom plate, the keycap moves relative to the keyboard frame or the bottom plate. An electronic device including the keyboard module is also provided.

According to a second aspect, an electronic device comprising a display module, a keyboard module and a hinge structure connected with the display module and the keyboard module is provided. The keyboard module includes a bottom plate, a plurality of keys and a keyboard frame. The key includes a keycap and a support member for connecting the keycap to the bottom plate. The plurality of keys disposed on the bottom plate. The keyboard frame includes a plurality of openings to expose the keycaps. When the display module rotates to drive the keyboard frame or the bottom plate, the keycap moves relative to the keyboard frame or the bottom plate.

In sum, in embodiments, with the configuration of the liftable type keycaps, the keyboard module is made thinner, and the travel of the key is sufficient to keep a feedback force when the keycap is pressed. Thus, it feels good in using the keyboard module, and scratches or pressures to the display screen are avoided when the display screen is closed.

BRIEF DESCRIPTION OF THE DRAWINGS

These and other features, aspects and advantages of the invention will become better understood with regard to the following embodiments and accompanying drawings.

DETAILED DESCRIPTION OF THE EMBODIMENTS

Keyboard modules and electronic devices including the keyboard module in embodiments are described by reference to the figures, and the same reference symbol denotes the same component.

Figure 1:
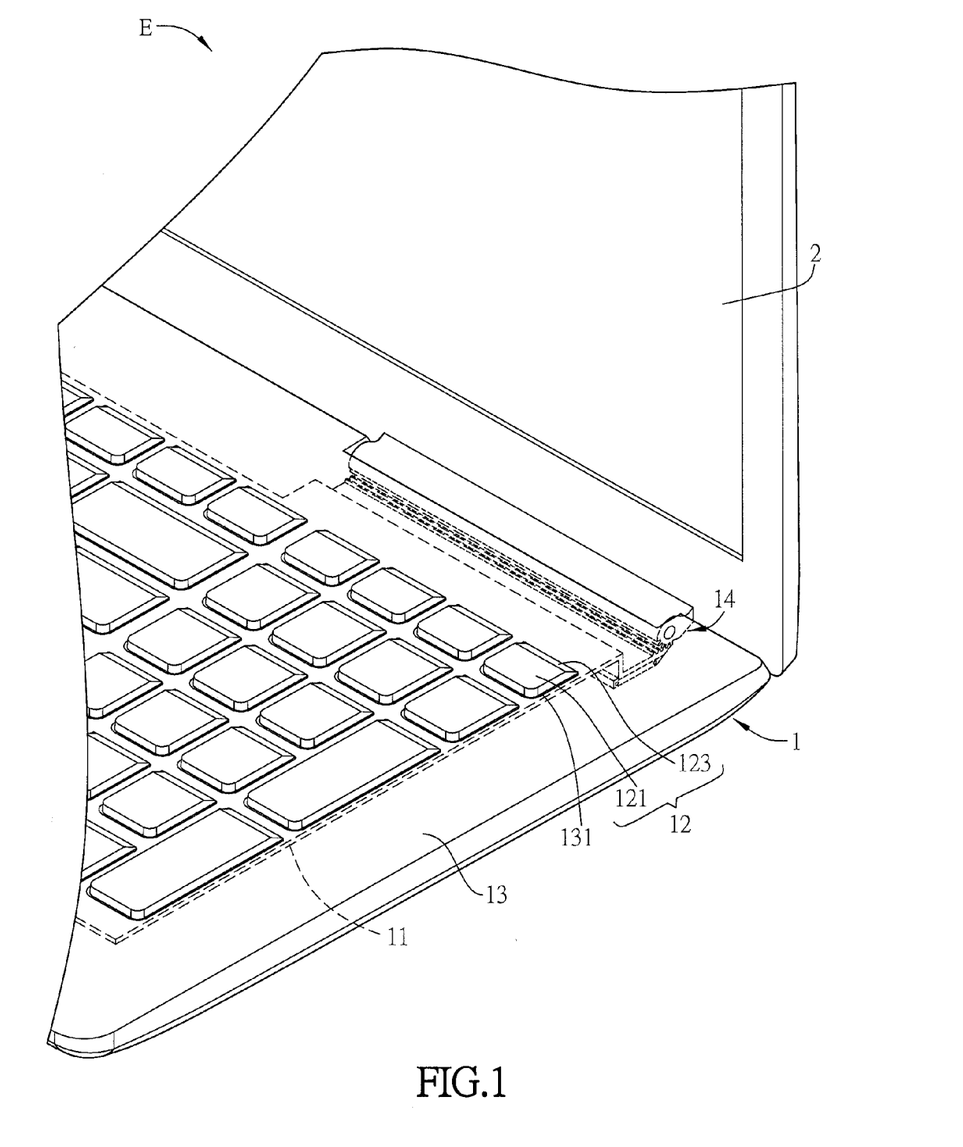
FIG. 1 is a schematic diagram showing an electronic device in an embodiment.
Figure 2:
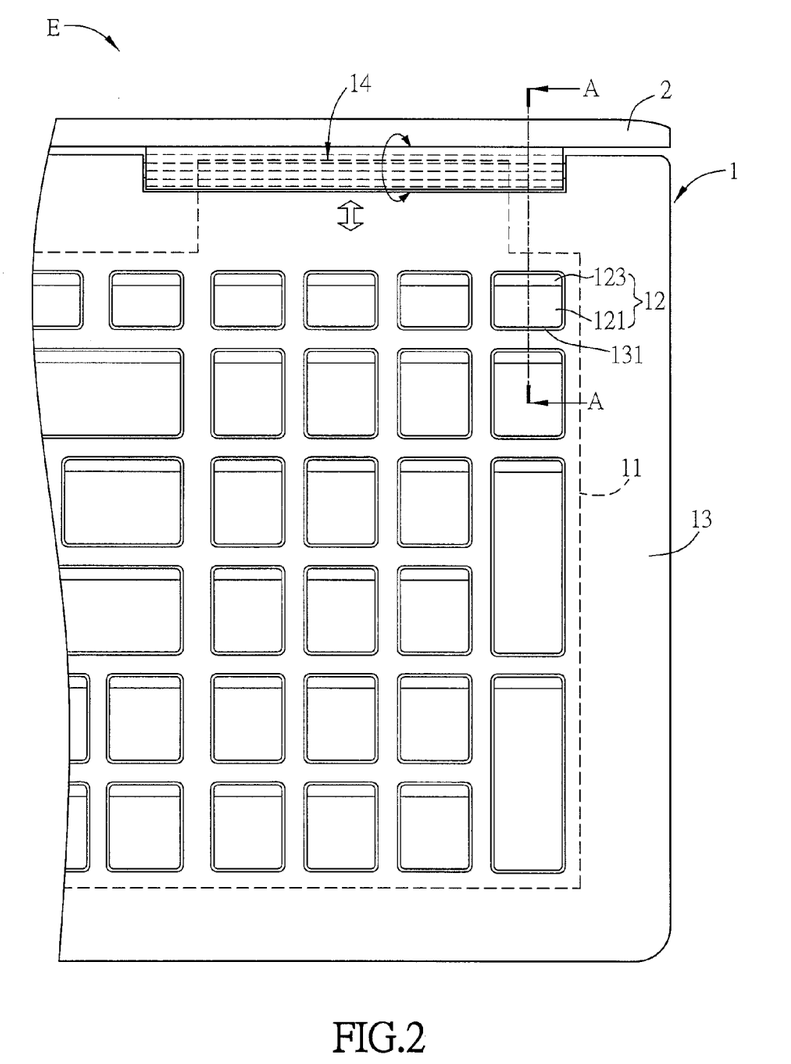
FIG. 2 is a schematic diagram showing the electronic device in FIG. 1 and a keyboard module thereof.
Figure 3A:
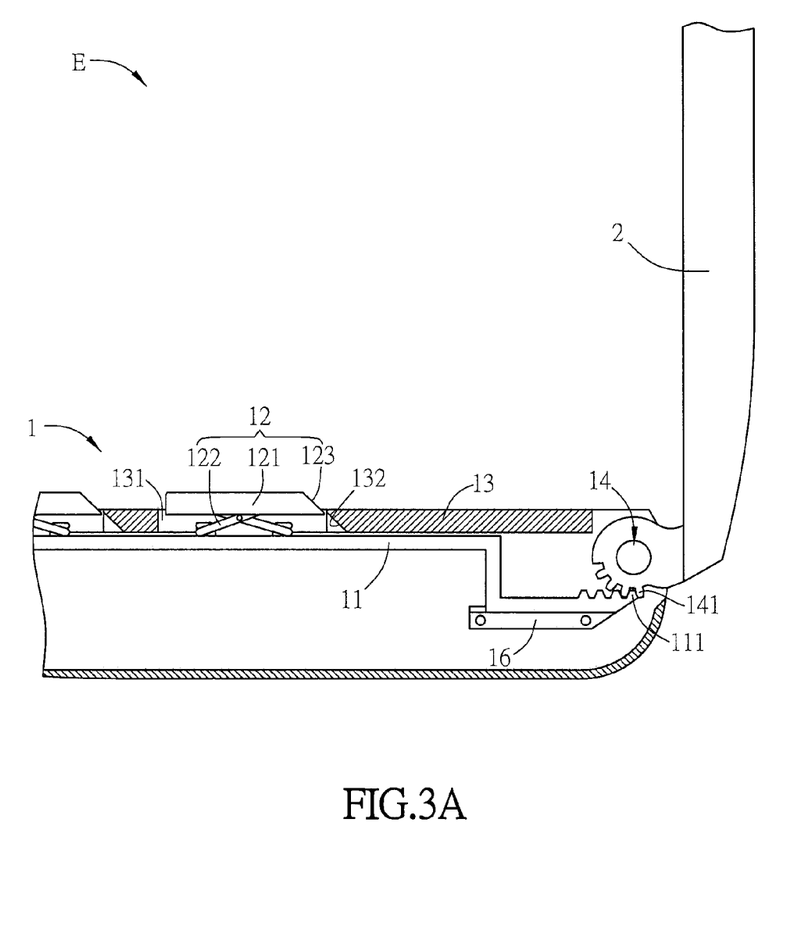
FIG. 3A is a section view of the keyboard module in FIG. 2 along line A-A.
Figure 3B:
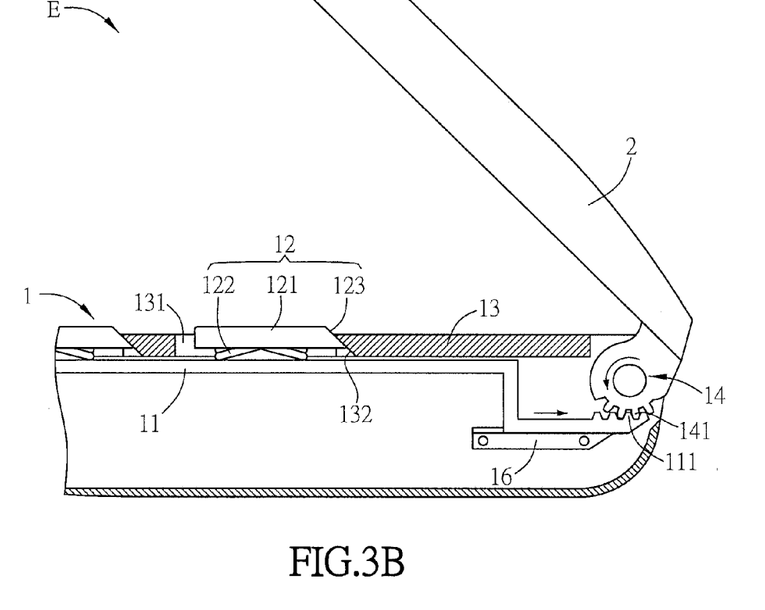
FIG. 3B-FIG. 3C are schematic diagrams showing a process of the key in FIG. 3A after pressed.
Figure 3C:
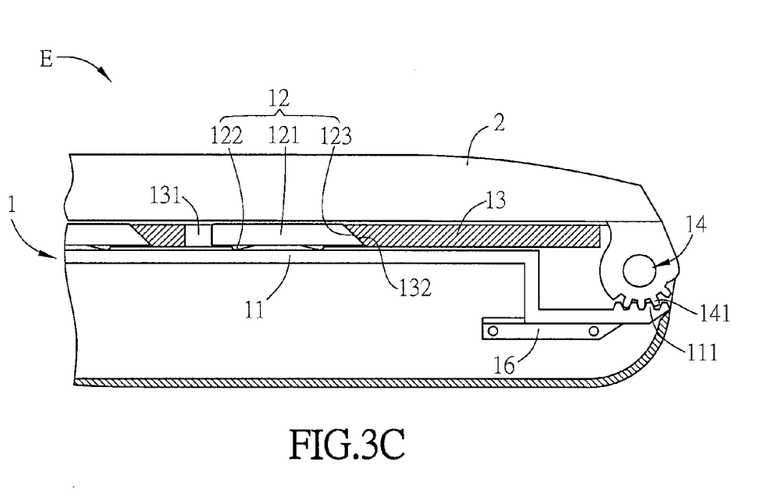

Referring to FIG. 1, FIG. 2 and FIG. 3A to FIG. 3C, FIG. 1 is a schematic diagram showing an electronic device in an embodiment. FIG. 2 is a schematic diagram showing the electronic device in FIG. 1 and a keyboard module thereof. FIG. 3A is a section view of the keyboard module in FIG. 2 along line A-A. FIG. 3B-FIG. 3C are schematic diagrams showing a process of the key in FIG. 3A after pressed.

In an embodiment, an electronic device E is a notebook. The electronic device E includes a keyboard module 1 and a display module 2.

The keyboard module 1 includes a bottom plate 11, a plurality of keys 12, a keyboard frame 13 and a hinge structure 14. An end of the hinge structure 14 is pivotally connected to the display module 2, and another end is pivotally connected to the bottom plate 11 or the keyboard frame 13 of the keyboard module 1. When users want to close the display module 2 of the electronic device E, the keyboard module 1 is driven by the display module 2 via the hinge structure 14, and then the keys 12 go down and the top surface of the keys is flushed with the top surface of the keyboard frame 13. Therefore, when the display module 2 is closed, the keys 12 of the keyboard module 1 would not press against or scratch the display module 2.

A plurality of keys 12 are disposed on the bottom plate 11. Each key 12 includes a keycap 121 and a support member 122. The keycap 121 is connected to the bottom plate 11 via the support member 122. The keyboard frame 13 includes a plurality of openings 131. The keycaps 121 protrude out of the openings 131, respectively.

The keycap 121 includes a first slope 123. The keyboard frame 13 includes a second slope 132 at the periphery of the opening 131. The first slope 123 and the second slope 132 contact closely. That is, the first slope 123 and the second slope 132 have a same gradient. In the embodiment, the first slope 123 and the second slope 132 have a same length, and thus the first slope 123 and the second slope 132 contact completely. When the keycap 121 moves relative to the keyboard frame 13, the first slope 123 abuts against the second slope 132 and moves to go down along the second slope 132, and thus the top surface of the keycap 121 is flushed with the top surface of the keyboard frame 13. In an embodiment, the length of the first slope 123 is less than that of the second slope 132, and thus the top surface of the keycap 121 is below the top surface of keyboard frame 13 after they abut together.

In an embodiment, the first slope 123 and the second slope 132 are flat or curved surfaces. That is, the first slope 123 and the second slope 132 are, but not limited to, two flat surfaces, two curved surfaces, or a combination of a flat surface, and a curved surface.

In an embodiment, the first slope 123 includes a chamfering (not shown in figures) disposed at a position where the first slope 123 begins to abut against the second slope 132. This reduces mechanism interferences (which hinder the keycap 121 from going down) when the first slope 123 abuts against and moves along the second slope 132. In an embodiment, the second slope 132 includes a chamfering disposed at a position where the second slope 132 begins to abut against the first slope 123. In another embodiment, both the first slope 123 and the second slope 132 include a chamfering.

The keycap 121 is connected to the bottom plate 11 via the support member 122. The keycap 121 moves up and down relative to the bottom plate 11 via the support member 122. A distance (namely a travel of the key) that the keycap 121 moves after pressed, is the distance that the support member 122 is compressed relative to the bottom plate 11. In the embodiment, the support member 122 is a scissors structure made of compressible materials, such as, plastic, rubber and high polymer materials, or metal.

The hinge structure 14 is connected to the bottom plate 11 or the keyboard frame 13. The connection herein includes direct or indirect connections. That is, the hinge structure 14 is directly connected to the bottom plate 11 (or the keyboard frame 13), or the hinge structure 14 is connected to the bottom plate 11 (or the keyboard frame 13) via other members (that is, indirectly connection).

When the display module 2 rotates via the hinge structure 14, the keyboard frame 13 is driven to move relative to the bottom plate 11. The first slope 123 and the second slope 132 move towards each other, and then the keycap 121 goes down to make the keycap 121 not protrude out of the opening 131.

As shown in FIG. 3A, in an embodiment, the hinge structure 14 is directly connected to the bottom plate 11. The hinge structure 14, for example, includes a gear mechanism to drive the bottom plate 11 to move. In the embodiment, the hinge structure 14 includes a gear. Accordingly, a rack is disposed at a position of the bottom plate 11 where the bottom plate 11 is connected to the hinge structure 14. In the embodiment, the gear of the hinge structure 14 includes the convex teeth 141, while the rack of the bottom plate 11 includes the convex teeth 111. Referring to FIG. 3B to FIG. 3C, when the hinge structure 14 rotates, the convex teeth 141 drive the convex teeth 111 to move, the bottom plate 11 is driven by the convex teeth 111 to move towards the hinge structure 14. At the same time, the keycap 121 disposed at the bottom plate 11 are driven to move, and then the first slope 123 moves towards the second slope 132. Since the support member 122 below the keycap 121 is compressible, when the first slope 123 abuts against and moves along the second slope 132, the keycap 121 goes down in the opening 131. Finally, the top surface of the keycap 121 is substantially flushed with or below the top surface of the keyboard frame 13. It is understood that "substantially flushed" also covers the "flush" with a slight drop between the top surface of the keycap 121 and the top surface of the keyboard frame 13 due to tolerances of components or in assembly.

In an embodiment, a fixing member 16, such as a slide-way structure, is disposed below the bottom plate 11 to facilitate the bottom plate 11 to move.

Figure 4A:
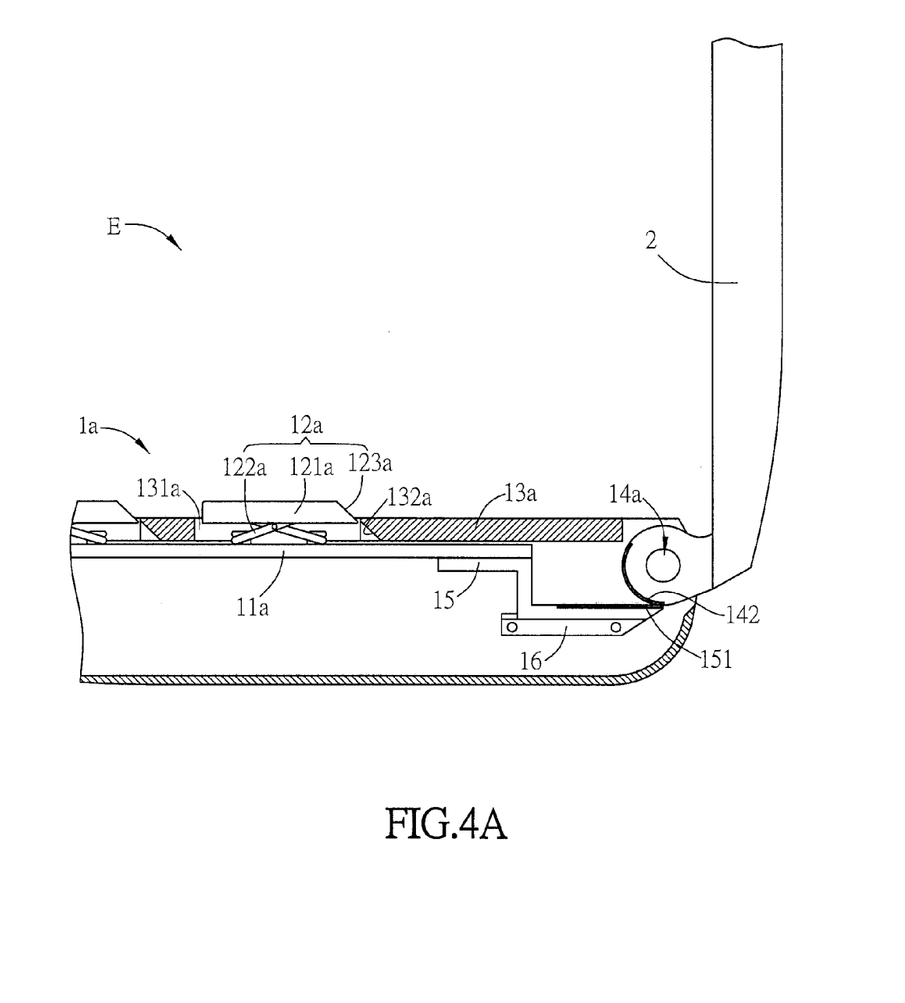
FIG. 4A is a schematic diagram showing the keyboard module in FIG. 2 in an embodiment.
Figure 4B:
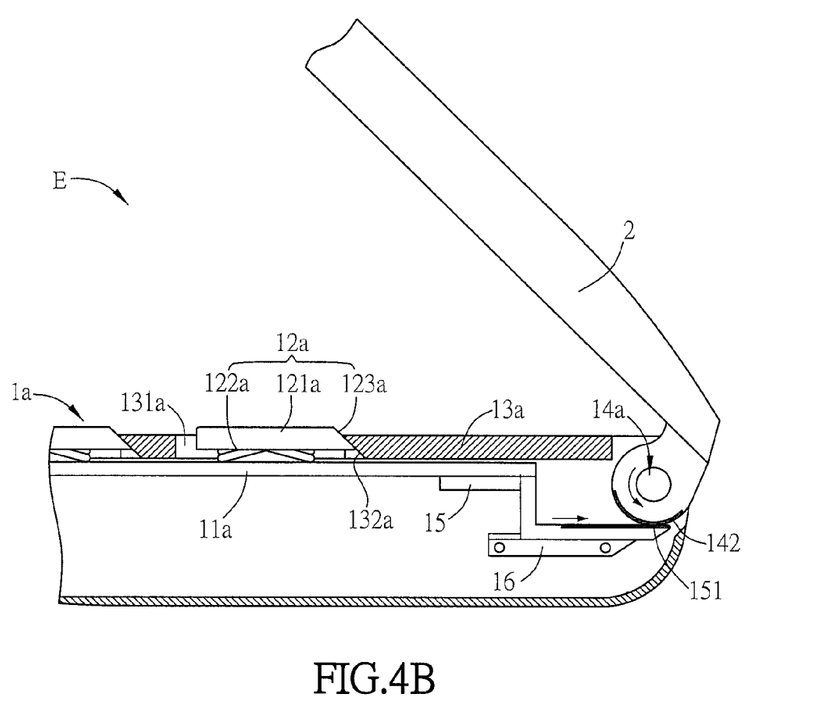
FIG. 4B-FIG. 4C are schematic diagrams showing a process of the key in FIG. 4A after pressed.
Figure 4C:
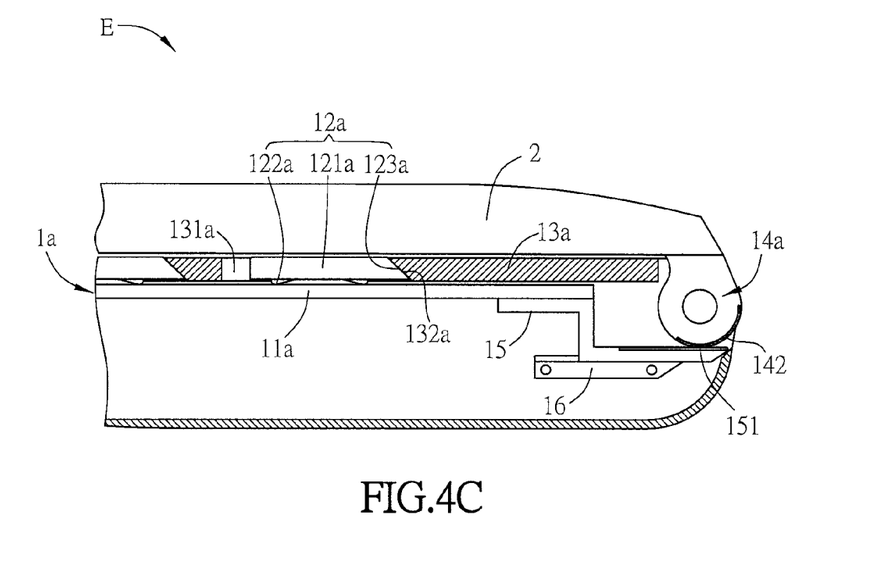

Referring to FIG. 4A to FIG. 4C, in an embodiment, the hinge structure 14a is indirectly connected to the bottom plate 11a. As shown in FIG. 4A, the hinge structure 14a is connected to the bottom plate 11a via a connecting unit. In the embodiment, the connecting unit is a connecting rod 15. The hinge structure 14a includes a rough surface 142. The connecting rod 15 includes a rough surface 151 corresponding to the rough surface 142 of the hinge structure 14a. The rough surface provides a high friction coefficient. In an embodiment, the material of the rough surface is, but not limited to, rubber or plastic. In an embodiment, the rough surface is, but not limited to, sandblasted. Referring to FIG. 4B and FIG. 4C, when the display module 2 rotates via the hinge structure 14a, the connecting rod 15 is driven by a friction force between the rough surface 142 and the rough surface 151, and the bottom plate 11a moves towards the hinge structure 14a via the connecting rod 15. At the same time, the keycap 121 disposed on the bottom plate 11a is also driven to move, and then the first slope 123a gets closer to the second slope 132a. Since the support member 122a below the keycap 121a is compressible, when the first slope 123a abuts against and moves along the second slope 132a, the keycap 121a goes down in the opening 131a. Finally, the top surface of the keycap 121a is flushed with or below the top surface of the keyboard frame 13a.

In an embodiment, a fixing member 16 is further disposed below the connecting rod 15. The fixing member 16 is, but not limited to, a sliding-way structure to facilitate the connecting rod 15 to move.

In an embodiment, the way of connecting the hinge structure with the bottom plate is, but not limited to, via a snap-type member (not shown in figures). The hinge structure includes a convex portion. The bottom plate includes a concave portion corresponding to the convex portion. When the hinge structure rotates, the bottom plate is driven to move via the engagement between the convex portion and the concave portion. In an embodiment, the hinge structure includes a concave portion, and the bottom plate includes a convex portion corresponding to the concave portion. Similarly, when the hinge structure rotates, the bottom plate is driven to move via the engagement between the convex portion and the concave portion.

Similarly, the hinge structure is connected to the connecting unit via a snap-type member. The hinge structure includes a convex portion. The connecting unit includes a concave portion corresponding to the convex portion. When the hinge structure rotates, the connecting unit is driven to move via the engagement between the convex portion and the concave portion, and then the bottom plate (or the keyboard frame) is driven to move. In an embodiment, the hinge structure includes the concave portion and the connecting unit includes a convex portion corresponding to the concave portion. Similarly, when the hinge structure rotates, the connecting unit is driven to move via the engagement between the convex portion and the concave portion, and then the bottom plate is driven to move.

Figure 5A:
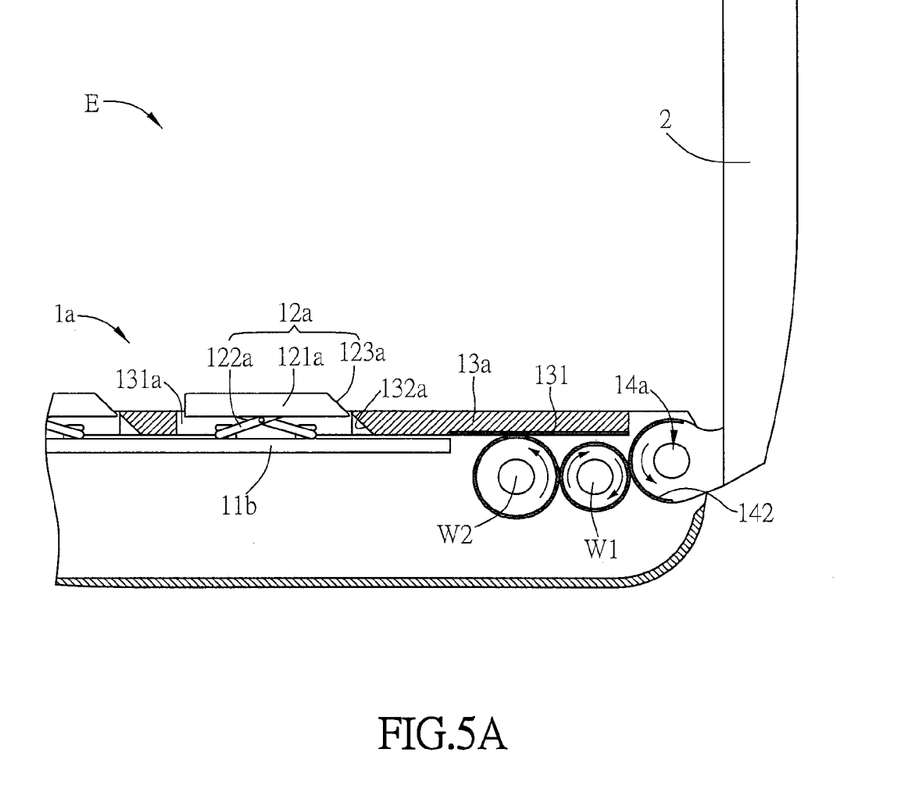
FIG. 5A-FIG. 5C are schematic diagrams showing that a keyboard frame is driven by a hinge structure.
Figure 5B:
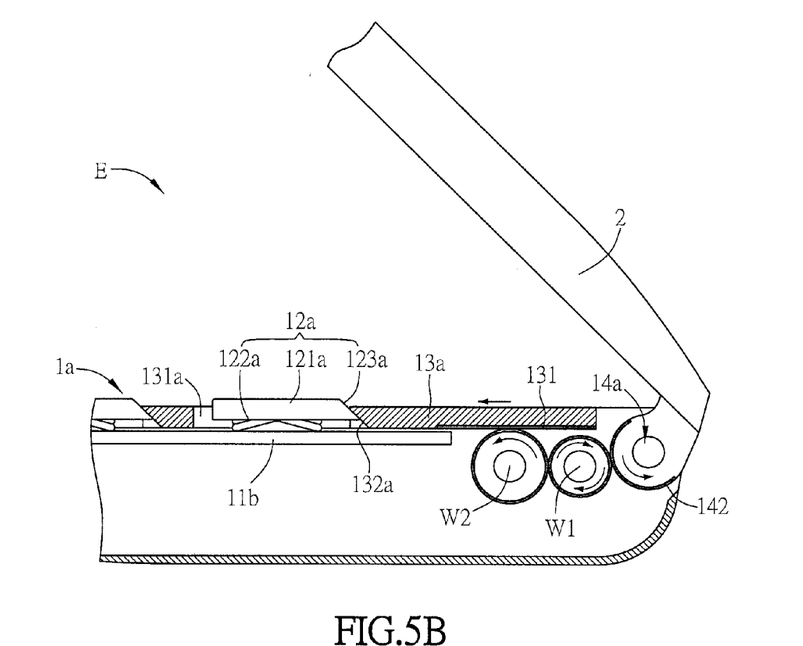
Figure 5C:
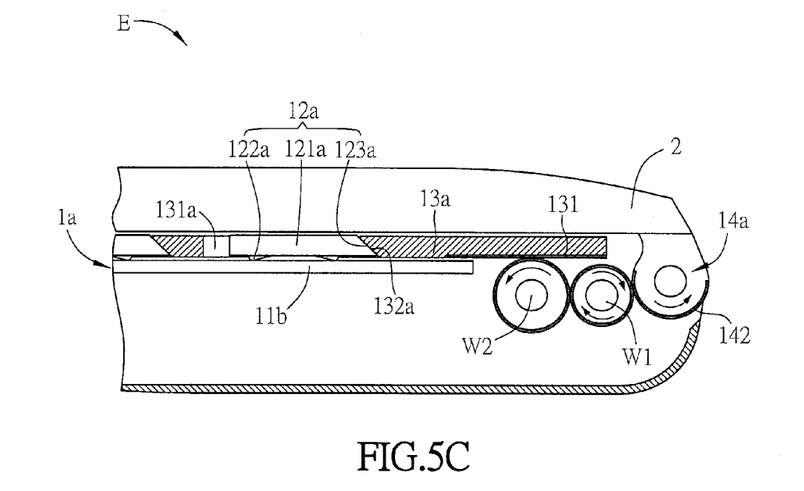

In the above embodiments, the hinge structure is pivotally connected to the bottom plate. In an embodiment, the hinge structure is pivotally connected to the keyboard frame. Referring to FIG. 5A to FIG. 5C, in an embodiment, when the display module 2 rotates, the rough surface 142 of the hinge structure 14a drives friction gears W1, W2, and then the keyboard frame 13a is driven to move relative to the bottom plate 11b (as indicated by a lateral arrow in FIG. 5B). The first slope 123a and the second slope 132a move towards each other, and the keycap goes down to make the keycap not protrude out of the opening. The way how the keyboard frame is driven to move by the hinge structure is exemplified in the embodiment only for description, which is not limited herein.

In an embodiment, the electronic device is a notebook in which the keyboard module is detachably connected to the display module (screen). In this case, the keyboard module is an external keyboard module. Since the external keyboard module is similar to the keyboard modules in the embodiments, the description of the external keyboard module is omitted herein. The notebook is connected to the external keyboard module via a hinge structure. When the notebook is not in use, during the process of closing the notebook, the hinge structure is driven to rotates, and the bottom plate or the keyboard frame of the keyboard module is driven to move via the hinge structure. Then, the key goes down and the top surface of the key is substantially flush with the top surface of the keyboard frame. Therefore, with the external keyboard module, the notebook is more convenient for use and the screen of the notebook is protected.

In an embodiment, an electronic device including a display module, a keyboard module and a hinge structure is provided. The hinge structure is connected with the display module and the keyboard module. The difference between this embodiment and the above embodiment is that the hinge structure is a separate element configured out of the keyboard module. The hinge structure and how the keyboard frame or the bottom plate is driven by the hinge structure refers to the description above, which is omitted here.

In sum, in embodiments, with the configuration of the liftable type keycaps, the keyboard module is made thinner, and the travel of the key is sufficient to keep a feedback force when the keycap is pressed. Thus, it feels good in using the keyboard module and scratches or pressures to the display screen are avoided when the display screen is closed.

Although the invention has been disclosed with reference to certain embodiments thereof, the disclosure is not for limiting the scope. Persons having ordinary skill in the art may make various modifications and changes without departing from the scope of the invention. Therefore, the scope of the appended claims should not be limited to the description of the embodiments described above.

What is claimed is:

1. A keyboard module pivotally connected to an electronic device, comprising:
    a bottom plate;
    a plurality of keys disposed on the bottom plate, each of the keys including:
        a keycap; and
        a support member for connecting the keycap to the bottom plate;
    a keyboard frame including a plurality of openings to expose the keycaps; and
    a hinge structure for pivotally connecting a display module of the electronic device to the keyboard frame or the bottom plate;
    wherein the keycap includes a first sidewall, a first slope is disposed along an entire surface of the first sidewall and toward the hinge structure, each of the plurality of openings of the keyboard frame includes a second sidewall opposite to the first sidewall of the keycap, a second slope is disposed along an entire surface of the second sidewall, and inclined directions of the first slope and the second slope are the same,
    wherein when the display module rotates to drive the keyboard frame or the bottom plate, the keycap moves relative to the keyboard frame or the bottom plate, and
    wherein the hinge structure is connected to the keyboard frame, when the display module rotates, the second slope moves towards the first slope, and then the second slope abuts against the first slope and the keycap goes down to make the keycap not protrude out of the opening.

2. An electronic device, including:
    a display module;
    a keyboard module; and
    a hinge structure connected with the display module and the keyboard module;
    the keyboard module including:
    a bottom plate;
    a plurality of keys disposed on the bottom plate, each of the keys including:
        a keycap; and
        a support member for connecting the keycap to bottom plate; and
    a keyboard frame including a plurality of openings to expose the keycaps;
    wherein the keycap includes a first sidewall, a first slope is disposed along an entire surface of the first sidewall and toward the hinge structure, each of the plurality of openings of the keyboard frame includes a second sidewall opposite to the first sidewall of the keycap, a second slope is disposed along an entire surface of the second sidewall, and inclined directions of the first slope and the second slope are the same,
    wherein when the display module rotates to drive the keyboard frame or the bottom plate, the keycap moves relative to the keyboard frame or the bottom plate, and
    wherein the hinge structure is connected to the keyboard frame, when the display module rotates, the second slope moves towards the first slope, and then the second slope abuts against the first slope and the keycap goes down to make the keycap not protrude out of the opening.

3. A keyboard module pivotally connected to an electronic device, comprising:
    a bottom plate;
    a plurality of keys disposed on the bottom plate, each of the keys including:
        a keycap; and
        a support member for connecting the keycap to the bottom plate;
    a keyboard frame including a plurality of openings to expose the keycaps; and
    a hinge structure for pivotally connecting a display module of the electronic device to the keyboard frame or the bottom plate;
    wherein the keycap includes a first sidewall, a first slope is disposed along an entire surface of the first sidewall and toward the hinge structure, each of the plurality of openings of the keyboard frame includes a second sidewall opposite to the first sidewall of the keycap, a second slope is disposed along an entire surface of the second sidewall, and inclined directions of the first slope and the second slope are the same,
    wherein when the display module rotates to drive the keyboard frame or the bottom plate, the keycap moves relative to the keyboard frame or the bottom plate, and
    wherein the hinge structure is connected to the bottom plate, when the hinge structure rotates, the first slope moves towards the second slope, and then the second slope abuts against the first slope and the keycap goes down to make the keycap not protrude out of the opening.

* * * * *